(12) United States Patent
Dahiya et al.

(10) Patent No.: US 11,601,740 B2
(45) Date of Patent: Mar. 7, 2023

(54) AUTOMATED MICROPHONE SYSTEM AND METHOD OF ADJUSTMENT THEREOF

(71) Applicants: Vivek Dahiya, Haryana (IN); Karan Sharma, Delhi (IN)

(72) Inventors: Vivek Dahiya, Haryana (IN); Karan Sharma, Delhi (IN)

( * ) Notice: Subject to any disclaimer, the term of this patent is extended or adjusted under 35 U.S.C. 154(b) by 206 days.

(21) Appl. No.: 17/413,527

(22) PCT Filed: Oct. 9, 2019

(86) PCT No.: PCT/IB2019/058592
§ 371 (c)(1),
(2) Date: Jun. 11, 2021

(87) PCT Pub. No.: WO2020/075081
PCT Pub. Date: Apr. 16, 2020

(65) Prior Publication Data
US 2022/0030343 A1     Jan. 27, 2022

(30) Foreign Application Priority Data

Oct. 11, 2018   (IN) .............................. 20181 1038687

(51) Int. Cl.
*H04R 1/00* (2006.01)
*H04R 3/00* (2006.01)
(Continued)

(52) U.S. Cl.
CPC ............... *H04R 1/08* (2013.01); *F16M 11/18* (2013.01); *H04R 1/028* (2013.01); *H04R 1/326* (2013.01);
(Continued)

(58) Field of Classification Search
CPC ... H04R 1/00; H04R 1/02; H04R 1/04; H04R 1/08; H04R 1/028; H04R 1/083;
(Continued)

(56) References Cited

U.S. PATENT DOCUMENTS 2,969,436 A  *  1/1961  Kilyk ........................ H04R 1/08
                                                              D14/227
3,007,014 A  *  10/1961 Bentman .................. H04R 1/08
                                                              248/161
(Continued)

FOREIGN PATENT DOCUMENTS

CN        206341361 U  *  7/2017  ............... H04R 1/10
KR        20120065553 A    12/2010
(Continued)

OTHER PUBLICATIONS

WO2014079003A1 English Translation, Jie Yu, Date: Jul. 2017 (Year: 2017).*
International Search Report dated Jan. 30, 2020 for PCT/IB2019/058592.

*Primary Examiner* — Thang V Tran
(74) *Attorney, Agent, or Firm* — Myers Wolin, LLC

(57) ABSTRACT

There is provided an automated microphone system (100) having a microphone (104). The system (100) comprises a microphone stand (102) having at least one movable arm (1022), at least one movable leg (1024) and a fixed base (1026) attached to the at least one movable leg (1024), the at least one movable arm (1022) being adapted to mount the microphone (104) at a first end and connected with the at least one movable leg (1024) at a second end, one or more sensors (106) disposed at one or more of the at least one movable leg (1024), the at least one movable arm (1022) and the fixed base (1026), one or more motors (108) connected with each of the at least one movable arm (1022), the at least one movable leg (1024) and the fixed base (1026) and a control module (110) connected with the one or more sensors (106) and the one or more motors (108).

9 Claims, 6 Drawing Sheets

(51) Int. Cl.
*H04R 29/00* (2006.01)
*F16M 11/18* (2006.01)
*H04R 1/08* (2006.01)
*H04R 1/02* (2006.01)
*H04R 1/32* (2006.01)
*F16M 11/12* (2006.01)

(52) U.S. Cl.
CPC .............. *F16M 11/12* (2013.01); *H04R 3/005* (2013.01); *H04R 29/007* (2013.01); *H04R 2201/025* (2013.01); *H04R 2227/009* (2013.01)

(58) Field of Classification Search
CPC .......... H04R 1/326; H04R 3/00; H04R 3/005; H04R 3/12; H04R 29/00; H04R 29/004; H04R 29/007; H04R 29/008; H04R 2201/025; H04R 2227/009; F16M 11/04; F16M 11/043; F16M 11/06; F16M 11/12; F16M 11/18
See application file for complete search history.

(56) References Cited

U.S. PATENT DOCUMENTS

| | | | | |
|---|---|---|---|---|
| 6,487,298 | B1* | 11/2002 | Hacker | H04R 1/08 381/387 |
| 8,320,588 | B2* | 11/2012 | McPherson | F16M 11/18 381/56 |
| 2007/0237344 | A1* | 10/2007 | Oster | H04R 3/00 381/113 |
| 2011/0254954 | A1* | 10/2011 | Lee | H04R 1/08 348/142 |
| 2012/0050527 | A1* | 3/2012 | Lee | F16M 11/18 348/135 |
| 2018/0246882 | A1* | 8/2018 | Pazhoor | H04H 20/61 |
| 2019/0306639 | A1* | 10/2019 | La Groe | H04R 27/00 |

FOREIGN PATENT DOCUMENTS

| | | | | |
|---|---|---|---|---|
| WO | WO-9946762 | A1* | 9/1999 | G10L 15/26 |
| WO | WO-2014079003 | A1* | 5/2014 | H04R 1/08 |
| WO | WO2017183127 | A1 | 10/2017 | |

\* cited by examiner

AUTOMATED MICROPHONE SYSTEM AND METHOD OF ADJUSTMENT THEREOF

FILED OF THE INVENTION

Embodiments of the present invention relate to technologies involved in intelligent sound systems and more particularly to an automated microphone system and a method of adjustment thereof.

BACKGROUND OF THE INVENTION

Microphones have long been used in events such as ceremonies, public meetings, assemblies, concerts etc. where a speaker needs to address a large group of people. To make the speaker's voice or sound of instruments (in concerts) understandably audible to everyone, microphones are used in combination with audio output speakers. The microphones are generally mounted or attached on a microphone stand so that the speaker or other performer does not have to hold the microphone while speaking. The microphone stands are generally adjustable as per the height of the user.

But the problem is most of the time when a number of speakers have to address an audience using the same microphone, then each speaker has to first adjust the microphone according to his/her height. The same has been illustrated in FIG. 1, that illustrates a speaker 18 talking on a microphone 12 placed on a podium 16 via a gooseneck attachment 14. As shown in FIG. 1, the speaker 18 is adjusting the gooseneck attachment 14 in order to make the microphone 12 reach proximal to a mouth of the speaker 18.

This causes a lot of discomfort to the speakers and if adjusted incorrectly (as is the case many-a-times) makes it hard for the audience to hear/understand. Additionally, the speaker has to stand in his place the whole time to maintain the right sound level. Additionally, microphones such as podium microphones which are mounted/attached on a flexible and adjustable stand that may be kept on table or a podium are commonly used in meeting halls, auditoriums etc. As the several speakers/members of a meeting have to use the microphone, so each one has to adjust the level of the microphone according to his/her height before speaking.

Accordingly, already existing technologies have number of drawbacks and there remains a need to have an automated microphone system and a method of adjustment thereof, which overcome the aforesaid problems and shortcomings.

OBJECT OF INVENTION

An object of the present invention is to provide an automated microphone system.

Another object of the present invention is to provide a method of adjustment of the automated microphone system.

Yet another object of the present invention is to utilise one or more sensors to determine position of a mouth of the user in real time.

Yet another object of the present invention is to utilise artificial intelligence and robotics to enable the self-adjustment of the automated microphone system.

SUMMARY OF THE INVENTION

The present invention is described hereinafter by various embodiments. This invention may, however, be embodied in many different forms and should not be construed as limited to the embodiment set forth herein.

Embodiments of the present invention provide an automated microphone system (hereinafter referred to as "the system") having a microphone. The system comprises a microphone stand having at least one movable arm, at least one movable leg and a fixed base attached to the at least one movable leg, the at least one movable arm being adapted to mount the microphone at a first end and connected with the at least one movable leg at a second end, one or more sensors disposed at one or more of the at least one movable leg, the at least one movable arm and the fixed base, one or more motors connected with each of the at least one movable arm, the at least one movable leg and the fixed base, a control module connected with the one or more sensors and the one or more motors. Further, the control module is configured to determine a presence of a user in front of the microphone within a predetermined distance and a position of a mouth of the user with respect to the microphone, using the one or more sensors, determine a movement required by each of the at least one movable arm and the at least one movable leg in one or more directions to reach the determined position and actuate the one or more motors to facilitate the determined movement of the at least one movable leg and the at least one movable arm to reach proximal to the mouth of the user, thereby completing the automated adjustment of the microphone with respect to the user in real time.

In accordance with an embodiment of the present invention, the microphone is a wired microphone or a wireless microphone.

In accordance with an embodiment of the present invention, the microphone is selected from a dynamic microphone, a condenser microphone or a piezoelectric microphone.

In accordance with an embodiment of the present invention, the one or more sensors are selected from a group comprising ultrasonic sensors, infrared sensors, laser sensors, sound sensors and face detection sensors.

In accordance with an embodiment of the present invention, the one or more motors are selected from servo motors, stepper motors and permanent magnet DC motors.

In accordance with an embodiment of the present invention, the movement in the one or more directions is the movement in forward, backward, upward, downward and sideways directions.

In accordance with an embodiment of the present invention, the system further comprises a translation module connected with the control module. Further, the control module is configured to translate a speech of the user in preselected one or more languages using the translation module.

In accordance with an embodiment of the present invention, the system further comprises a screen connected with the control module. Further, the control module is configured to display the translated speech in the one or more languages on the display screen in real time.

In accordance with an embodiment of the present invention, the system further comprises a plurality of audio output devices associated with audience, connected with the control module. Further, the control module is configured to provide the translated speech in the one or more languages on the audio output devices in real time.

In accordance with an embodiment of the present invention, the system further comprises a display module and a communication module provided at the fixed base of the microphone stand. Further, the communication module is configured to connect the system to one or more computing devices, over a communication network and the one or more computing devices may send one or more instructions to be displayed on the display module, the one or more instructions being used to prompt the user about the points to be covered in the speech, convey changes and/or additions in the speech.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE DRAWINGS

Figure 1:
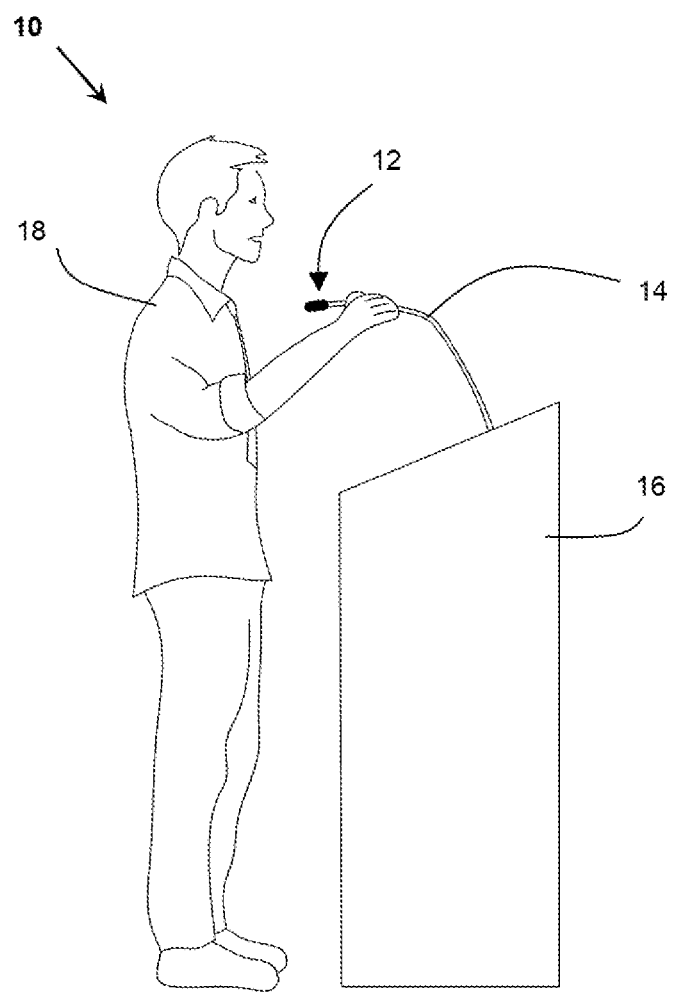
FIG. 1 illustrates a conventional podium microphone, in accordance with prior art.

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Figure 2:
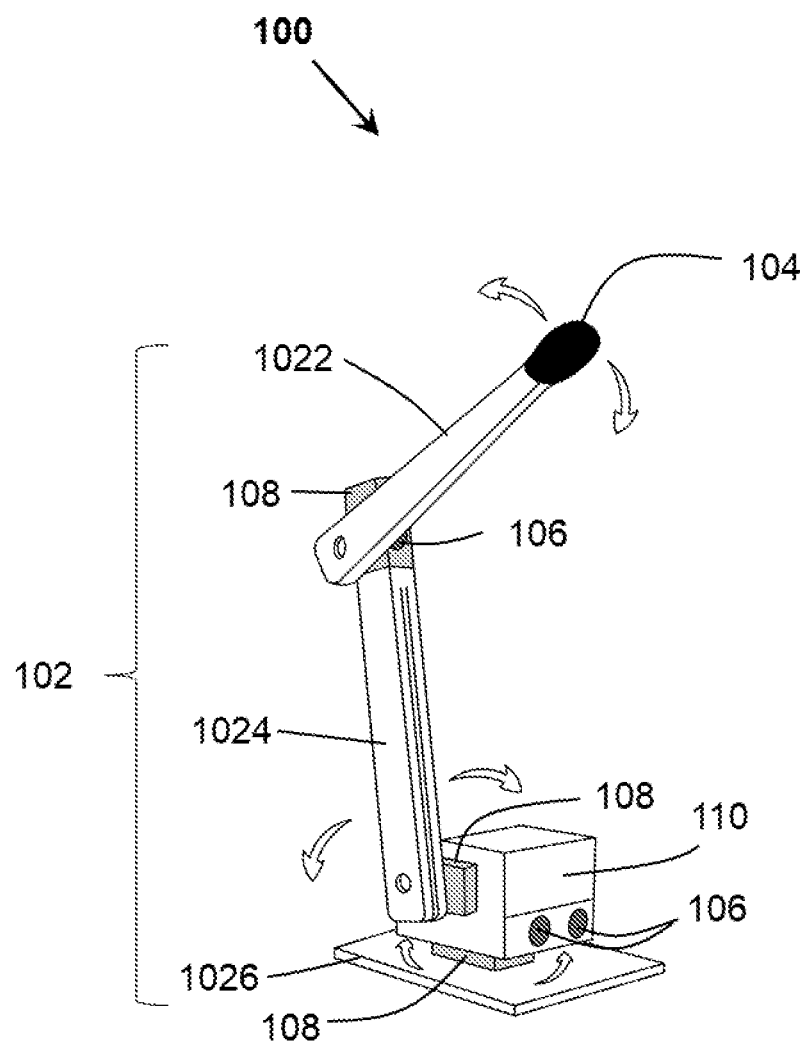
FIG. 2 illustrates an automated microphone system, in accordance with an embodiment of the present invention.

FIG. 2 illustrates an automated microphone system (100) (hereinafter referred to as the "system (100)"), in accordance with an embodiment of the present invention. As shown in FIG. 1, the system (100) comprises, but not limited to, a microphone stand (102) having at least one movable arm (1022), at least one movable leg (1024) and a fixed base (1026) attached to the at least one movable leg (1024). The at least one movable arm (1022) is adapted to mount a microphone (104) at a first end and connected with the at least one movable leg (1024) at a second end. In general, microphones are configured to convert the air pressure variations of a sound wave to an electrical signal using different techniques/methods. For the present invention, the microphone (104) may be selected from, but not limited to, a dynamic microphone (104), which uses a coil of wire suspended in a magnetic field, a condenser microphone (104), which uses the vibrating diaphragm as a capacitor plate, or a piezoelectric microphone (104), which uses a crystal of piezoelectric material. The microphone (104) may also be connected with a preamplifier before the signal can be recorded or reproduced.

The at least one movable arm (1022), the at least one movable leg (1024) and the fixed base (1026) may be connected using, but not limited to, a connection means such as a mechanical joint, an adhesive, ball and socket connection or any other connection means that allows the rotation of the connecting components, with respect to each other. Besides, the at least one movable arm (1022), the at least one movable leg (1024) and the fixed base (1026) may be made of, but not limited to, plastic, wood, steel, aluminium, ceramic or any other metal.

In one embodiment, the microphone stand (102) may be placed on, but not limited to, a ground or a floor of a stage allowing a user (206) to stand and deliver a speech or address an audience. In another embodiment, the microphone stand (102) is podium (204) microphone stand (102) that may be kept on, but not limited to, a podium (204) or a table (such as in board meetings). In the podium (204) microphone stand (102), the movable arm (1022) may be flexible and capable of bending and retaining a bent position upon application of force. Additionally, the microphone (104) may be, but not limited to, wired or wireless.

The system (100) further comprises one or more sensors (106) disposed at one or more of the at least one movable leg (1024), the at least one movable arm (1022) and the fixed base (1026). The one or more sensors (106) may be, but not limited to, sound sensors, ultrasonic sensors (capable of measuring height or any other dimension of an object that needs to be determined), Infrared (IR) sensors, laser sensors, face detection sensors and accelerometer. Furthermore, one or more motors (108) are connected with each of the at least one movable arm (1022), the at least one movable leg (1024) and the fixed base (1026). The one or more motors (108) may be, but not limited to, servo motors, stepper motors and permanent magnet DC motors capable of providing rotary motion to the at least one movable arm (1022), the at least one movable leg (1024), in predefined one or more directions. The predefined one or more directions may be forward, backward, upward, downward and sideways directions.

Also included in the system (100) is a control module (110) connected with the one or more sensors (106) and the one or more motors (108). The control module (110) may be connected with the fixed base (1026) and the at least one movable leg (1024) via the one or more motors (108). The control module (110) may comprise, but not limited to, a microcontroller (not shown). The microcontroller may include one or more CPUs (processor cores) along with memory and programmable input/output peripherals. Program memory in the form of ferroelectric RAM, NOR flash or OTP ROM is also often included on the chip, as well as a small amount of RAM. In one embodiment, a separate microprocessor (not shown) may be included in the control module (110). The microprocessor may be a multipurpose, clock driven, register based, digital integrated circuit that accepts binary data as input, processes it according to instructions stored in its memory and provides results as output. The microprocessor may contain both combinational logic and sequential digital logic.

In accordance with an embodiment of the present invention, the system (100) may also include a communication module, a storage module, a display module and a translation module (not shown in figures). The communication module is envisaged to connect the system (100) to one or more computing devices over a communication network. The one or more computing devices may be associated with organisers of the event, owners, management or team members of the speaker. Examples of the one or more computing devices may include, but are not limited to, a personal computer, a portable computing device, a tablet, a laptop, a mobile computer, a wearable computer, a communication device such as a smartphone, and a personal digital assistant, and the like.

The communication network can be a short-range communication network and/or a long-range communication network, wire or wireless communication network. The communication interface includes, but not limited to, a serial communication interface, a parallel communication interface or a combination thereof. The communication network (150) may be implemented using a number of protocols, such as but not limited to, TCP/IP, 3GPP, 3GPP2, LTE, IEEE 802.x etc. The communication network (150) may be wireless communication network selected from one of, but not limited to, bluetooth, radio frequency, WIFI network or satellite communication network providing maximum coverage.

Further, the display module may be provided at, but not limited to, the base of the microphone stand (102). The display module (not shown) may be, but not limited to, an LED display, LCD display or a TFT display, capable of displaying information received from the one or more computing devices over the communication network. Further, the translation module may include a speech to text converter and/or a language translator capable of translating a plurality of languages to another language within seconds or in real-time. Also, the storage module may be a cloud based or a local storage having prestored data such, but not limited to, height of person vs face length ratios, face length vs mouth position ratios, ratio of position of various facial features etc. of males and females.

In accordance with an embodiment of the present invention, the system (100) may also include a face recognition module (not shown) connected with the control module (110). The face recognition module may include, but not limited to, a depth camera or a thermal camera capable of recognizing facial features of the user (206). The system (100) may further comprise artificial intelligence and machine learning based technologies, but not limited to, for data analysis, collating data, presentation of data in real-time.

FIGS. 3A-3E illustrates a method (200-280) of adjustment of automated microphone system (100) of FIG. 2, in accordance with an embodiment of the present invention. As shown in the FIG. 3A, the microphone stand (102) mounting the microphone (104), is installed/placed on a podium (204). In this exemplary implementation, the microphone stand (102) is envisaged to have one movable arm (1022) and one movable leg (1024) and the one or more sensors (106) (not shown) are envisaged to be placed at the joint of the movable arm (1022) and the movable leg (1024). In these FIGS. 3A-3E, the one or more motors (108) are envisaged to be present at the joints of each of the movable arm (1022) & the movable leg (1024), the control module (110) & the movable leg (1024), and the fixed base (1026) & the control module (110). This enables the movable arm (1022) to provide upward and downward motion; enables the movable leg (1024) to provide forward and back motion; and enables the control module (110) to provide sideways motion with respect to the fixed base (1026).

Figure 3A:
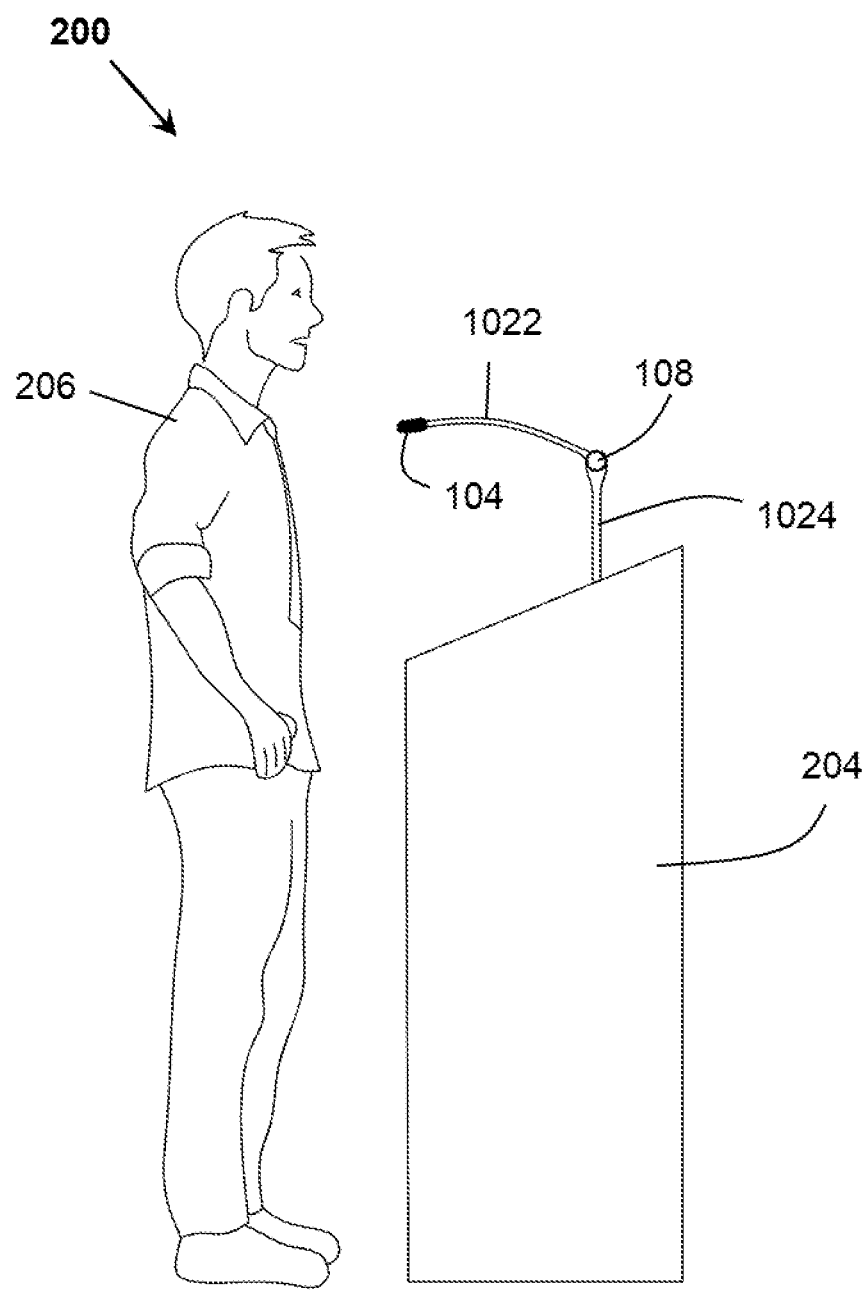
FIG. 3A-3E illustrates a method of adjustment of automated microphone system of FIG. 2, in accordance with an embodiment of the present invention.
Figure 3B:
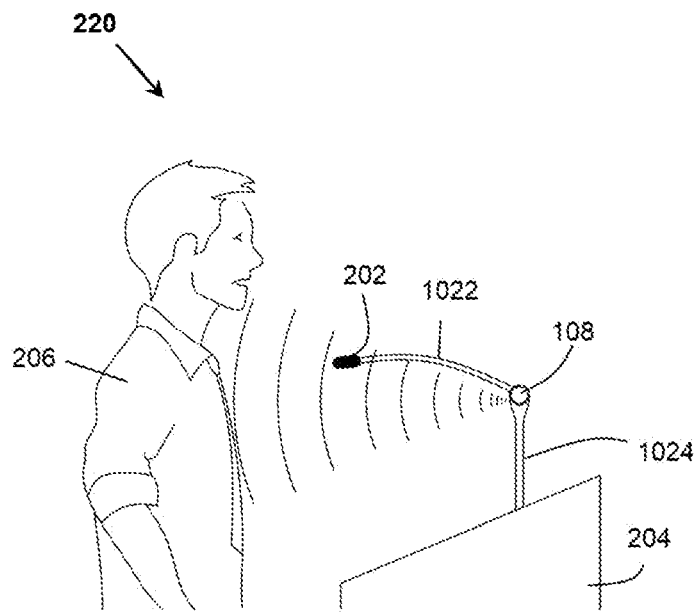
Figure 3C:
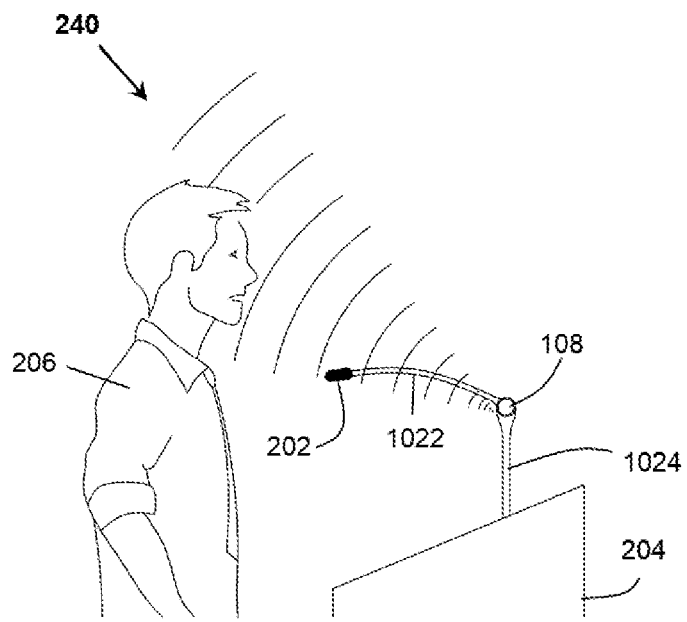
Figure 3D:
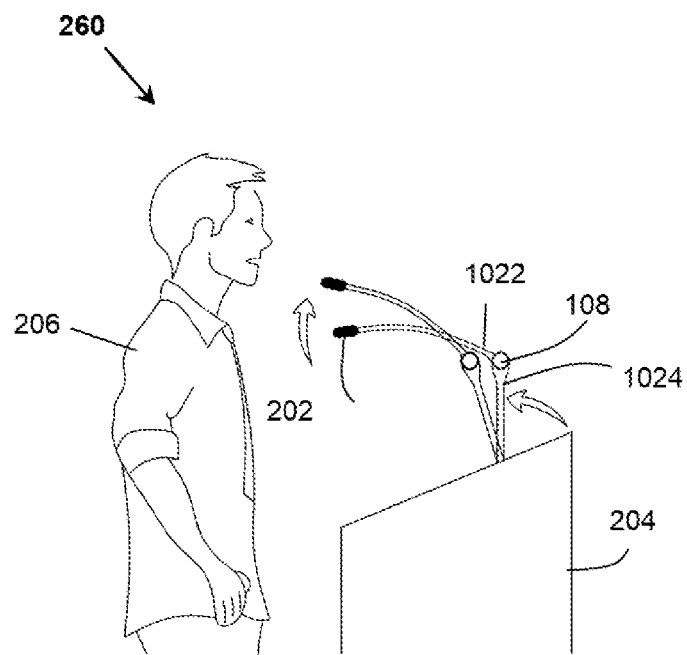
Figure 3E:
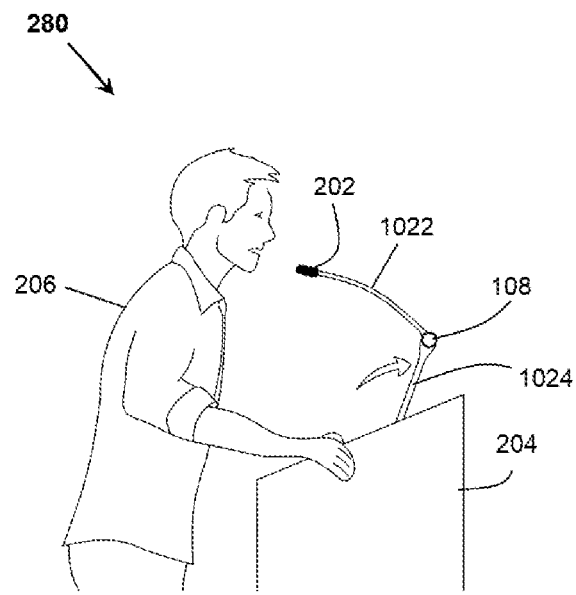

As seen in FIG. 3A, the user (206) is getting ready to deliver a speech, but the microphone (104) is not present within a predetermined proximity from a mouth of the user (206). The optimum predetermined proximity may be, but not limited to, 15-20 cm from the mouth of the user (206). So, the method starts when the control module (110) is configured to determine a presence of a user (206) in front of the microphone (104) within a predetermined distance, say 50-70 cm, from the microphone (104) using the one or more sensors (106). If the user (206) is successfully detected, then next step is to determine a position of the mouth of the user (206) with respect to the microphone (104). These have been illustrated in FIGS. 3B and 3C.

In one embodiment, the microcontroller of the control module (110), may determine the position of a mouth by using the ultrasonic sensors only. The ultrasonic sensor may determine a distance of the user (206) from the microphone (104)/microphone stand (102) and the height of the user (206). The height of the user (206) may be used to calculate and determine the position of the mouth based on prestored data such as, but not limited to, general height vs face length ratios, face length vs mouth position ratios etc. of males and females.

In another embodiment, the ultrasonic sensors may start determining a part of the user (206)'s face closest to the microphone (104) starting from the head by moving downwards and determine a tip of the nose to be the closest. The mouth being just below the tip of the nose may then be determined.

In yet another embodiment, the microcontroller may determine the position of the mouth of the user (206) using the face recognition module (for recognising the mouth) and the one or more sensors (106) (ultrasonic sensors for determining the position of the recognised mouth with respect to the microphone (104)) in combination. In yet another embodiment, the microcontroller may determine the position of the eyes of the user (206) and accordingly estimate the position of the mouth with respect to eyes and then with respect to the microphone (104) using the pre-stored ratios of facial features of males and females. In yet another embodiment, the user (206) may be required to speak something and enable the microcontroller to determine the position of the mouth using the sound sensors and the ultrasonic sensors.

The above-mentioned method may or may not use the artificial intelligence technologies depending upon the computation. However, it will be appreciated by a person skilled in the art, that any other methods or sensors may also be used to determine a position of the mouth of the user (206), without departing from the scope of the present invention.

Next step is, for the control module (110) to determine a movement required by each of the at least one movable arm (1022) and the at least one movable leg (1024) in one or more directions to reach with the predetermined proximity to the determined position. The movement may be in terms of angle of rotation of each of the one or more motors (108). Further, the microcontroller of the control module (110) actuates the one or more motors (108) to facilitate the determined movement of the at least one movable leg (1024) and the at least one movable arm (1022) to reach within the predetermined proximity to the mouth of the user (206). Continuing the above-mentioned example and referring to FIG. 3D, it can be seen that the movable leg (1024) is rotated/moved forward and the movable arm (1022) is rotated/moved upwards so that the microphone (104) reaches the required position. If required sideways movement may also be facilitated to correctly position the microphone (104). This completes the automated adjustment of the microphone (104) with respect to the user (206) in real time.

In accordance with an embodiment of the present invention, the control module (110) is further configured to continuously monitor the movement of the user (206) while delivering a speech, and automatically adjust the position of the microphone (104) depending upon the movement using the one or more sensors (106) and the one or more motors (108), in real-time. For example: referring to FIG. 3E, as the user (206) leans forward towards the podium (204) during his speech (continuing from FIG. 3D), the one or motors are configured by the microcontroller to move/rotate the movable leg (1024) backwards to compensate for the movement of the user (206). In some embodiments, a predetermined (significant) movement may be required for automatic adjustment to begin. In that case, the predetermined acceptable ranges may be pre-configured in the control module (110). For example: if the user (206) is moving within 15-30 cm of the microphone (104), the control module (110) will not readjust the position.

In accordance with an embodiment of the present invention, the method may also comprise a step of determining a sound level received by the microphone (104) using the one or more sensors (106) (sound sensors). If the sound level received is more or less than a predetermined sound level, say 40-60 decibels, then at next step the microcontroller configures the one or more motors (108) to move the movable arm (1022) away, close, up or down depending upon requirement of increasing or decreasing the decibels till the predetermined sound level is achieved.

Additionally, the one or more motors (108) may also be configured to move the movable arm (1022) sideways the user (206) to negotiate the small lateral movements of the user (206) or the face of the user (206), that are within the range of the movable arm (1022), in real-time. Also, each of the one or more sensors (106) may be arranged in a way and preconfigured to receive equal decibel levels to so as to ensure that the microphone (104) is positioned directly in front of the mouth of the user (206). So, the one or more motors (108) may also be configured by the microcontroller to move and position the microphone (104) till each of the one or more sensors (106) receive equal decibel levels.

Figure 4:
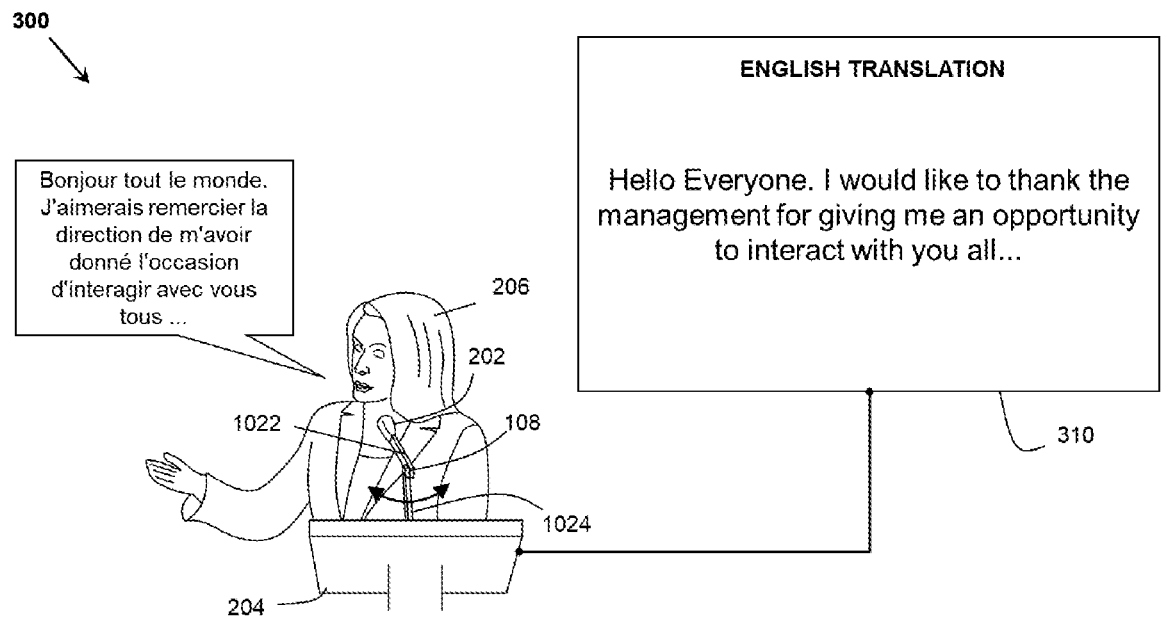
FIG. 4 illustrates a real-time translation of a user's speech on a display screen, in accordance with another embodiment of the present invention.

FIG. 4 illustrates a real-time translation of a user's (206) speech on a display screen (310), in accordance with another embodiment of the present invention. As shown in FIG. 4, the user (206) is delivering a speech in French language, but the audience may need a translation in a different predetermined language such as, but not limited to, English. So, a screen (310) is connected with the control module (110). The control module (110) in combination with the translation module may convert the speech of the user (206) to text and translate the speech of the user (206) to the predetermined language. The translated speech (in text) may be displayed on a display screen (310) to the audience. This would be advantageous as the people in audience who understand only the predetermined language would understand the speech, eliminating the need for a human translator. Additionally, the audience and the speaker would not have to deal with the interruption in speech which often happens as the human translator is vocally translating the speech simultaneously.

Figure 5:
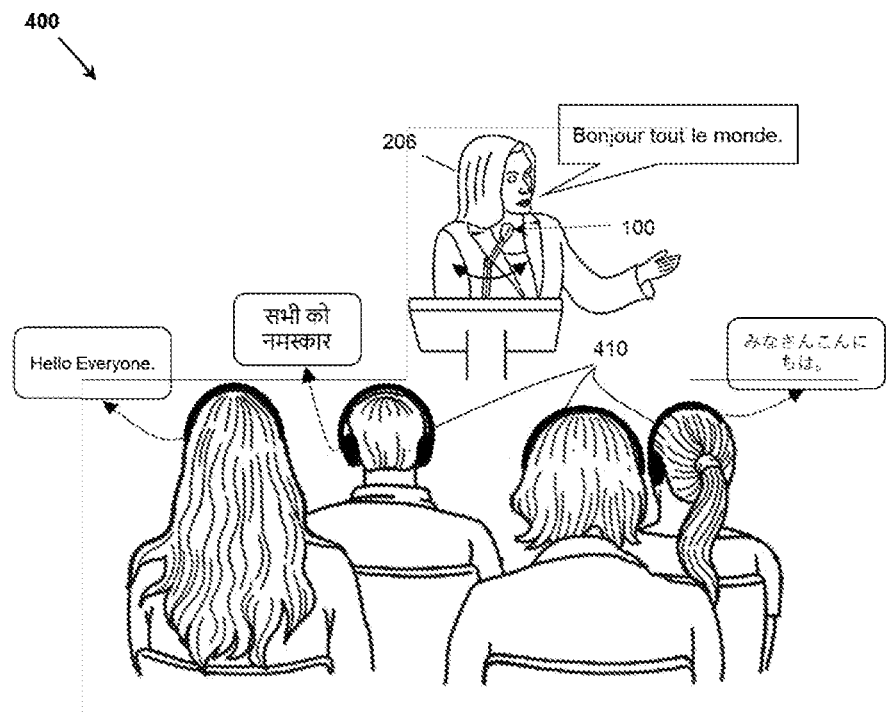
FIG. 5 illustrates a real-time translation of the user's speech on audio output devices of the audience, in accordance with another embodiment of the present invention.

In another embodiment, instead of the screen (310), the audience may be provided or are envisaged to be equipped with audio output devices (410). The audio output devices (410) may be, but not limited to, wired or wireless, earphones, headphones, headsets etc. The same has been shown in FIG. 5, that illustrates a real-time translation of the user's (206) speech on the audio output devices (410) of the audience. In this embodiment, each audio output device of the audience may be enabled to select a particular/predetermined language to receive a translation of the speech. The control module (110) in combination with the translation module may translate the speech of the user (206) to each of the selected predetermined languages and provide them on respective audio output devices (410) at the same time. As can be seen in the FIG. 5, the user (206) is delivering the speech in French language, the audience is hearing the selected English, Hindi and Japanese translation respectively. These features are quite useful in international events such UN assemblies, bilateral meets etc. as this would break the language barrier.

In accordance with yet another embodiment of the present invention, the display module and a communication module may be provided at the fixed base (1026) of the microphone stand (102). The communication module is configured to connect the system (100) to one or more computing devices, over the communication network. The one or more computing devices may be used send one or more instructions to be displayed on the display module. The one or more computing devices may be the smartphones, laptops or desktop PCs associated with the event organisers or owners. The one or more instructions may be used to prompt the user (206) about the points to be covered in the speech, convey changes and/or additions in the speech.

This way, the present invention offers a number of advantages. Firstly, the system offers a cost-effective and easy to implement solution to the problems of prior art. The present invention utilises the concepts of robotics and the artificial intelligence to enable automated movement of the microphone stand. The present invention is applicable for, but not limited to, stage microphones and podium microphones. Additionally, the present invention also takes care of the optimum sound level that needs to be maintained automatically. The present invention is applicable to all type of microphones and microphone stands, such as, but not limited to, gooseneck microphones or those used in concerts and for instruments.

The present invention ensures the correct positioning of the microphone by utilising the ultrasonic sensors for determining the position of the mouth and then utilising the sound sensors and the sound levels for confirming the correctness of the position. Besides Moreover, the lateral movement of the user that are within the range of the movable arm, are automatically negotiated by adjusting the microphone using movable arm, the present eliminates the need for translator by providing the translation of the speech.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and the appended claim.

The invention claimed is:

1. An automated microphone system (100) having a microphone (104), the system (100) comprising:
    a microphone stand (102) having atleast one movable arm (1022), atleast one movable leg (1024) and a fixed base (1026) attached to the atleast one movable leg (1024), the atleast one movable arm (1022) being adapted to mount the microphone (104) at a first end and connected with the atleast one movable leg (1024) at a second end;
    one or more sensors (106) disposed at one or more of the atleast one movable leg (1024), the atleast one movable arm (1022) and the fixed base (1026);
    one or more motors (108) connected with each of the atleast one movable arm (1022), the atleast one movable leg (1024) and the fixed base (1026); and
    a control module (110) connected with the one or more sensors (106) and the one or more motors (108);
    a display module and a communication module provided at the fixed base (1026) of the microphone stand (102);
    wherein the control module (110) is configured to:
        determine a presence of a user (206) in front of the microphone (104) within a predetermined distance and a position of a mouth of the user (206) with respect to the microphone (104), using the one or more sensors (106);
        determine a movement required by each of the atleast one movable arm (1022) and the atleast one movable leg (1024) in one or more directions to reach the determined position;
        actuate the one or more motors (108) to facilitate the determined movement of the atleast one movable leg (1024) and the atleast one movable arm (1022) to reach proximal to the mouth of the user (206), thereby completing the automated adjustment of the microphone (104) with respect to the user (206) in real time;
    wherein the communication module is configured to connect the system (100) to one or more computing devices, over a communication network, and to receive from the one or more computing devices one or more instructions to be displayed on the display module, wherein the one or more instructions prompt the user (206) about the points to be covered in the speech, convey changes and/or additions in the speech.

2. The system (100) as claimed in claim 1, wherein the control module (110) is further configured to continuously monitor the movement of the user (206) while delivering a speech, and automatically adjust the position of the microphone (104) depending upon the movement using the one or more sensors (106) and the one or more motors (108), in real-time.

3. The system (100) as claimed in claim 2, wherein the microphone (104) is selected from a dynamic microphone (104), a condenser microphone (104) or a piezoelectric microphone (104).

4. The system (100) as claimed in claim 1, wherein the one or more sensors (106) are selected from a group comprising ultrasonic sensors, infrared sensors, laser sensors, sound sensors and face detection sensors.

5. The system (100) as claimed in claim 1, wherein the one or more motors (108) are selected from servo motors, stepper motors and permanent magnet DC motors.

6. The system (100) as claimed in claim 1, wherein the movement in the one or more directions is the movement in forward, backward, upward, downward and sideways directions.

7. The system (100) as claimed in claim 1, further comprising a translation module connected with the control module (110);
    wherein the control module (110) is configured to translate a speech of the user (206) in preselected one or more languages using the translation module.

8. The system (100) as claimed in claim 7, further comprising a screen (310) connected with the control module (110);
    wherein the control module (110) is configured to display the translated speech in the one or more languages on the display screen (310) in real time.

9. The system (100) as claimed in claim 7, further comprising a plurality of audio output devices (410) associated with audience, connected with the control module (110);
    wherein the control module (110) is configured to provide the translated speech in the one or more languages on the audio output devices (410) in real time.

* * * * *